(12) United States Patent
Chuang

(10) Patent No.: US 6,431,739 B1
(45) Date of Patent: Aug. 13, 2002

(54) ILLUMINATING APPARATUS USING MULTIPLE LIGHT SOURCES

(75) Inventor: Fu-Ming Chuang, Hsin-Chu Hsien (TW)

(73) Assignee: Prokia Technology Co., Ltd., Hsin-Shih Hsiang (TW)

( * ) Notice: Subject to any disclaimer, the term of this patent is extended or adjusted under 35 U.S.C. 154(b) by 17 days.

(21) Appl. No.: 09/789,228

(22) Filed: Feb. 20, 2001

(51) Int. Cl.[7] ................................................. F21V 7/00

(52) U.S. Cl. ...................... 362/558; 362/236; 362/235

(58) Field of Search ................................ 362/558, 237, 362/236, 235, 244, 245, 247, 241

(56) References Cited

U.S. PATENT DOCUMENTS

| 5,526,237 A | * | 6/1996 | Davenport et al. ..... 362/241 X |
| 5,918,974 A | * | 7/1999 | Suzuki et al. ........... 362/558 X |
| 6,179,439 B1 | * | 1/2001 | Choate ................... 362/244 X |

* cited by examiner

*Primary Examiner*—Laura K. Tso
(74) *Attorney, Agent, or Firm*—Merchant & Gould P.C.

(57) ABSTRACT

An illuminating apparatus includes a plurality of light members spaced apart from each other and operable so as to produce forwardly directed parallel light rays, a parabolic reflector disposed in front of the light members for receiving the forwardly directed parallel light rays from the light members, and an integrator unit. The parabolic reflector has a reflecting surface that confronts the light members. The integrator unit has an input side to receive the light rays reflected by the reflecting surface of the parabolic reflector.

3 Claims, 2 Drawing Sheets

ILLUMINATING APPARATUS USING MULTIPLE LIGHT SOURCES

BACKGROUND OF THE INVENTION

1. Field of the Invention

The invention relates to an illuminating apparatus for a projection display, more particularly to an illuminating apparatus that utilizes a plurality of light sources to generate input light for a projection display.

2. Description of the Related Art

In a conventional projection display, input light is filtered and separated into color components that are modulated and subsequently recombined to generate an image output. A single light source is commonly used to generate the input light in the conventional projection display. For projection displays with a high requirement of brightness, the single light source will incur a corresponding increase in power requirement. High-power single light sources are disadvantageous in that there is a severe heat dissipation problem that is difficult to resolve when such light sources are in use.

SUMMARY OF THE INVENTION

Therefore, the object of the present invention is to provide an illuminating apparatus that utilizes a plurality of light sources to generate input light for a projection display.

According to the present invention, an illuminating apparatus comprises:

a plurality of light members spaced apart from each other and operable so as to produce forwardly directed parallel light rays;

a parabolic reflector disposed in front of the light members for receiving the forwardly directed parallel light rays from the light members, the parabolic reflector having a reflecting surface that confronts the light members; and an integrator unit having an input side to receive the light rays reflected by the reflecting surface of the parabolic reflector.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
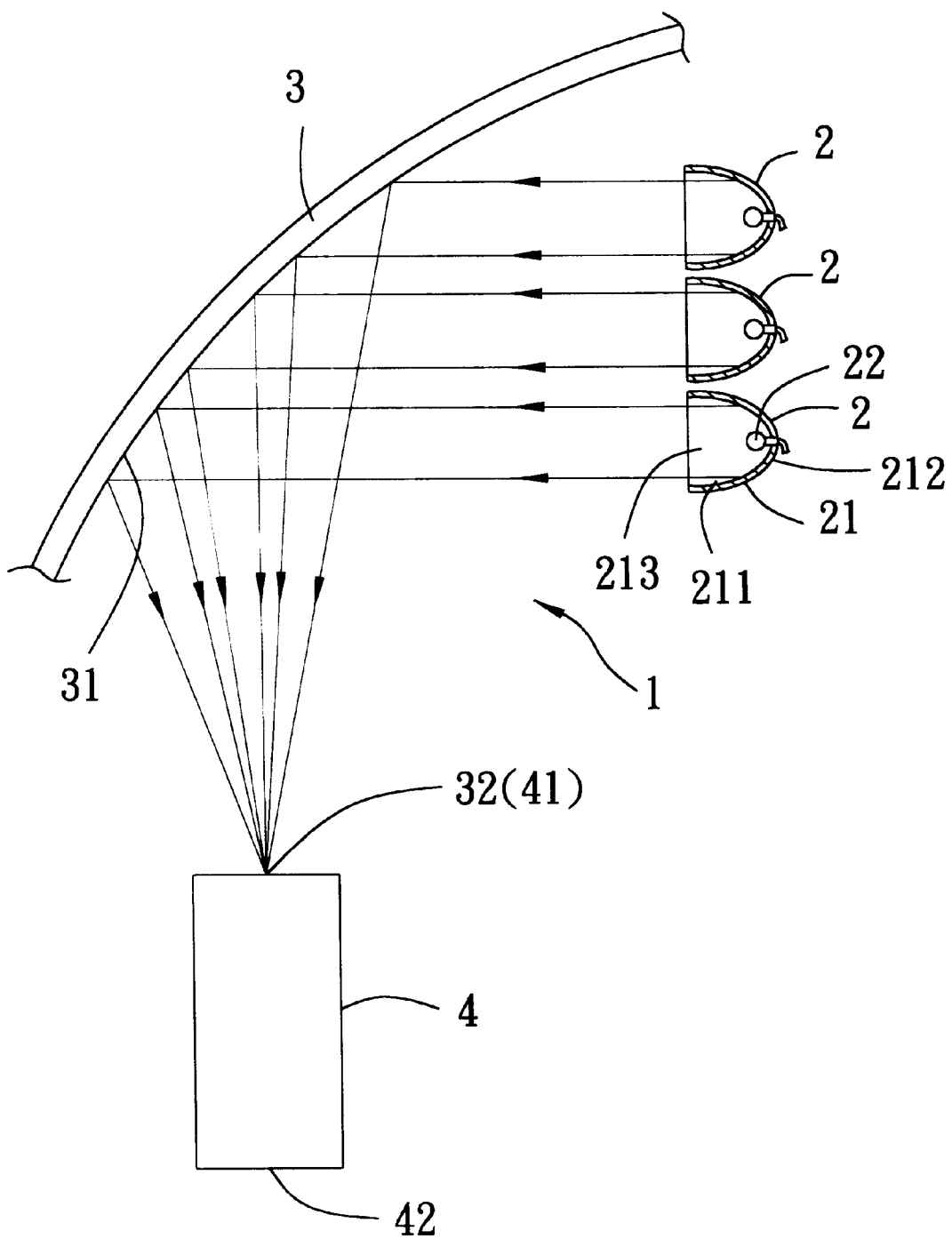
FIG. 1 is a schematic view of the first preferred embodiment of an illuminating apparatus according to this invention.

Referring to FIG. 1, the first preferred embodiment of an illuminating apparatus 1 according to the present invention is shown to comprise a plurality of light members 32, a parabolic reflector 3, and an integrator unit.

The light members 2 are spaced apart from each other and are disposed on a common place. Each of the light members 2 includes a light source 22 and a parabolic reflector 21. The parabolic reflector 21 has a connecting end 212 for connecting the light source 22, and an open end 213 opposite to the connecting end 212. The light parabolic reflector 21 further has a reflecting surface 211 for reflecting light rays that radiate from the light source 22 to produce forwardly directed parallel light rays. In design, the number of the light members 2 depends on the requirement of brightness in a projection display. The light members 2 can be arranged in a ring formation.

The parabolic reflector 3 is disposed in front of the light members 2 for receiving the forwardly directed parallel light rays from the light members 2. The parabolic reflector 3 has a reflecting surface 31 that confronts the light members 2, and a focal point 32.

The integrator unit includes a rod integrator 4 that has an input side 41 to receive the light rays reflected by the reflecting surface 31 of the parabolic reflector 3. The input side 41 of the rod integrator 4 is coincident with the focal point 32 such that the light rays reflected by the reflecting surface 31 converge at the input side 41. As such, input light for a projection display (not shown) can be obtained from an output side 42 of the rod integrator 4.

Because the high power is distributed among the light members 2, the heat dissipation problem commonly encountered with the use of a high-power single light source as taught in the prior art can be easily overcome. In addition, when one of the light members 2 breaks down, the illuminating apparatus can still work as long as the remaining light members 2 are operable.

Figure 2:
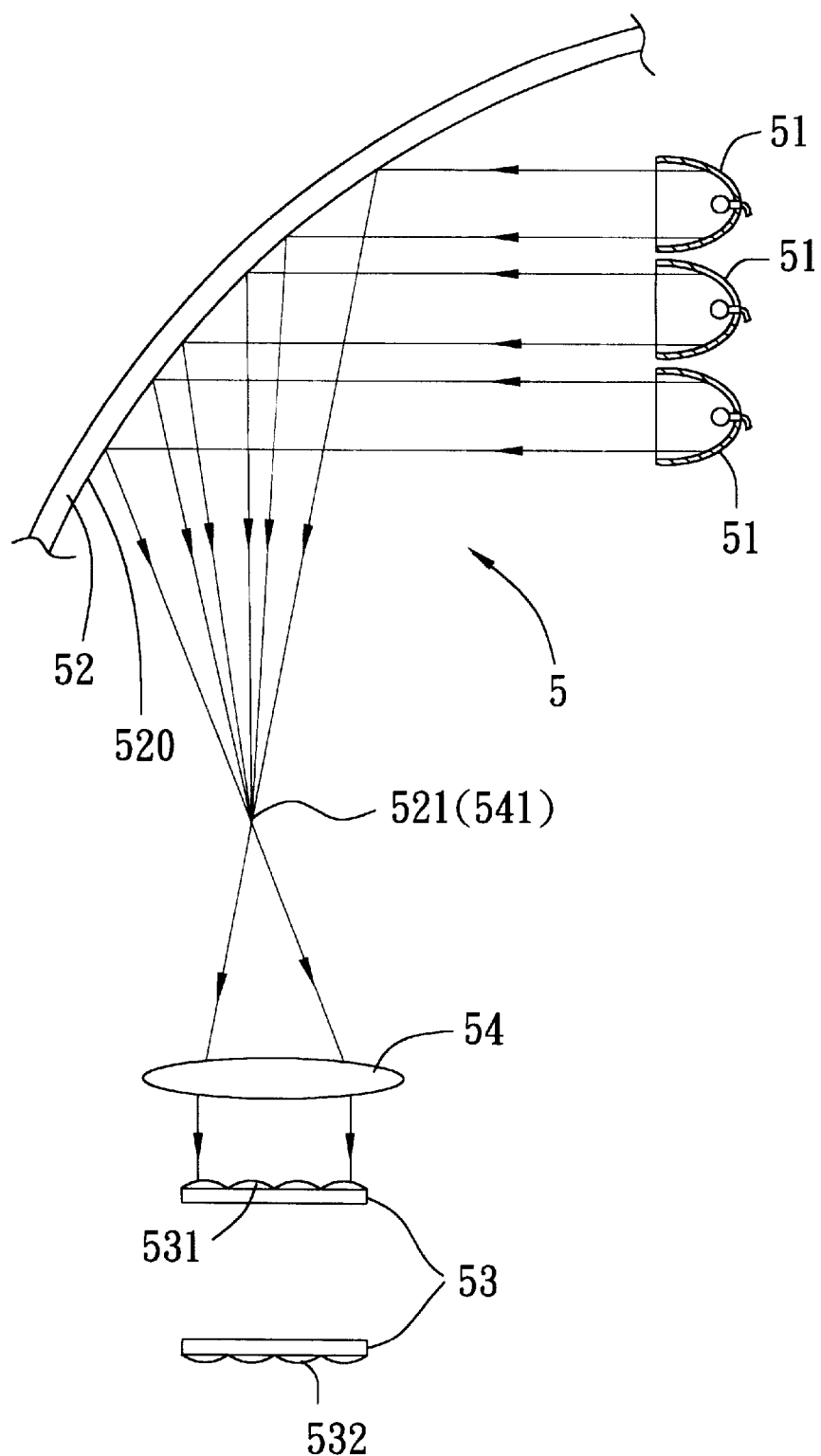
FIG. 2 is a schematic view of the second preferred embodiment of an illuminating apparatus according to this invention.

FIG. 2 illustrates the second preferred embodiment of an illuminating apparatus 5 according to this invention, which is a modification of the first preferred embodiment. Unlike the previous embodiment, the integrator unit includes a lens array integrator 53, and a lens 54. The lens array integrator 53 has an incident end 531 that confronts the reflecting surface 520 of the parabolic reflector 52, and a radiating end 532. The lens 54 is disposed between the parabolic reflector 52 and the lens array integrator 53. The lens 54 has a second focal point 541 that is coincident with the first focal point 521 of the parabolic reflector 52 such that the light rays reflected by the reflecting surface 520 converge at the first and second focal points 521, 541 and pass through the lens 54 and such that the light rays are radiated in parallel toward the incident end 531 of the lens array integrator 53.

Like the previous embodiment, because the high power is distributed among the light members 51, the heat dissipation problem commonly encountered with the use of a high-power single light source as taught in the prior art can be easily overcome.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An illuminating apparatus comprising:

a plurality of light members spaced apart from each other and operable so as to produce forwardly directed parallel light rays;

a parabolic reflector disposed in front of said light members for receiving the forwardly directed parallel light rays from said light members, said parabolic reflector having a reflecting surface that confronts said light members, and a first focal point; and an integrator unit having an input side to receive the light rays reflected by said reflecting surface of said parabolic reflector.

2. The illuminating apparatus of claim 1, wherein said integrator unit includes a rod integrator having said input side that is coincident with said first focal point such that the light rays reflected by said reflecting surface converge at said input side.

3. The illuminating apparatus of claim 1, wherein said integrator unit includes:

a lens array integrator having an incident end that confronts said reflecting surface of said parabolic reflector, and a radiating end; and a lens disposed between said parabolic reflector and said lens array integrator, said lens having a second focal point that is coincident with said first focal point such that the light rays reflected by said reflecting surface converge at said first and second focal points and pass through said lens and such that the light rays are radiated in parallel toward said incident end of said lens array integrator.

* * * * *